Jan. 16, 1962
R. P. VINCENT
3,016,844
GAS LIFT APPARATUS
Filed Feb. 10, 1958
2 Sheets-Sheet 1
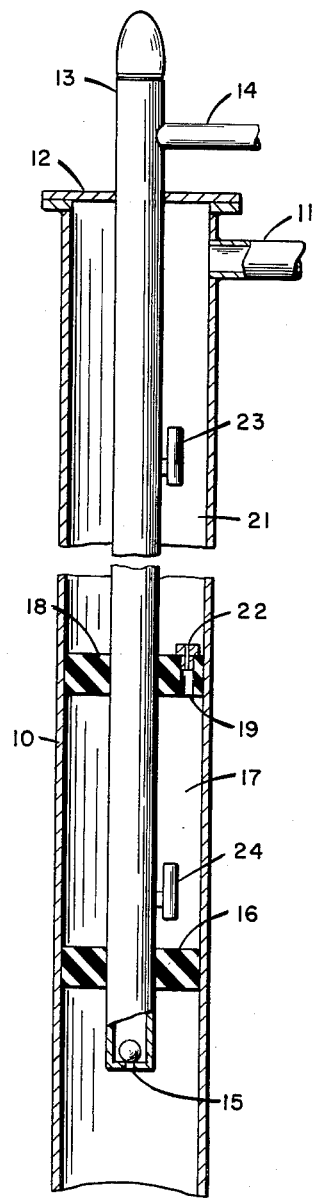
FIG. 1
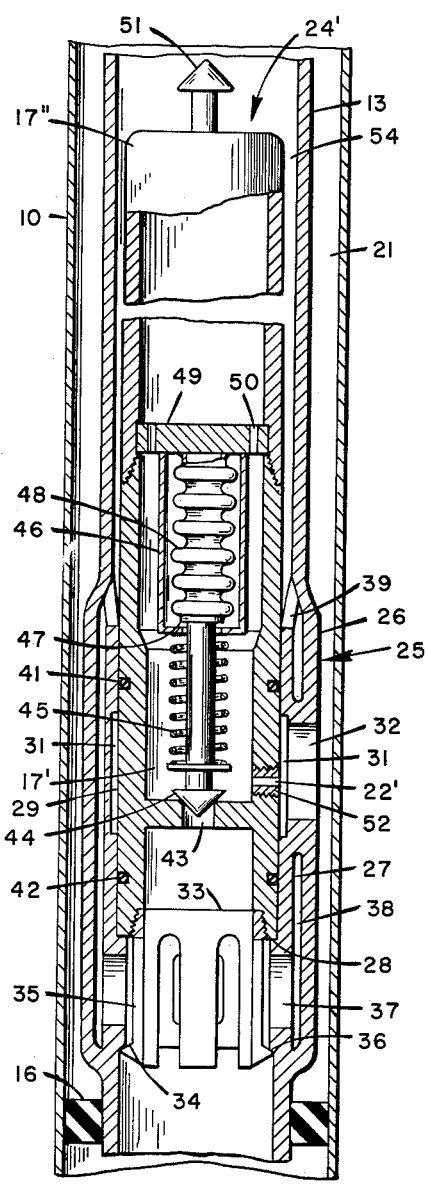
FIG. 2
RENIC P. VINCENT
INVENTOR.
ATTORNEY 3,016,844
GAS LIFT APPARATUS
Renic P. Vincent, Tulsa, Okla., assignor to Pan American Petroleum Corporation, Tulsa, Okla., a corporation of Delaware
Filed Feb. 10, 1958, Ser. No. 714,108
11 Claims. (Cl. 103—232)

This invention relates to an improved apparatus for gas lifting a well and, more particularly, it relates to a means for increasing the lifting efficiency of a continuous gas lift system.

I have found that the lifting gas/produced liquid ratio and the lifting efficiency of a gas lift well, particularly a gas lift well which produces continuously, can be substantially increased by reducing heading or slugging of the liquid near the surface in the producing conduit. "Heading" as the term is used herein refers to the intermittent production from a well of separately detactable slugs of liquid and gas. As the length of a slug of liquid in a gas lift well increases, the longer the slug of gas beneath that slug of liquid must be to lift the liquid. As the length of the gas slug is thus increased, the greater the blowdown of gas following the production of each slug of liquid and consequently the greater the loss of energy and the lower the lifting efficiency. This lifting efficiency can be increased, I have found, by providing a continuous gas lift system in which the lengths of the intermittent slug of liquid and gas are reduced to a minimum or the two are so uniformly blended at the top of a well that there is apparently no slugging or heading of the produced fluid.

This can be accomplished by producing short alternate slugs of liquid and gas in the producing conduit at or near the bottom of a well. That is, by injecting short slugs of the lifting gas intermittently into the liquid in the producing conduit at a rate sufficient to halt temporarily the flow of liquid into the producing conduit, slippage of liquid in the tubing or other producing conduit can be substantially reduced and the lifting efficiency can be materially increased.

It is therefore an object of this invention to provide an improved gas lift system. It is a more specific object of this invention to provide an apparatus for injecting gas into a liquid producing conduit intermittently at relatively high frequency for the purpose of increasing the lifting efficiency of the gas. It is a still more specific object of this invention to provide a gas lift valve which will periodically inject at high frequency, a large volume of gas into a production conduit of a continuous gas lift well. Other objects of this invention will become apparent from the following description. In this description reference will be made to the accompanying drawings in which:

FIGURE 1 is a cross-sectional view of a gas lift well apparatus showing schematically the elements of this invention;

FIGURE 2 is a cross-sectional view of part of a well and one embodiment of a gas lift valve particularly adapted to inject gas periodically at rapid rate into a producing conduit, and;

Figure 3:
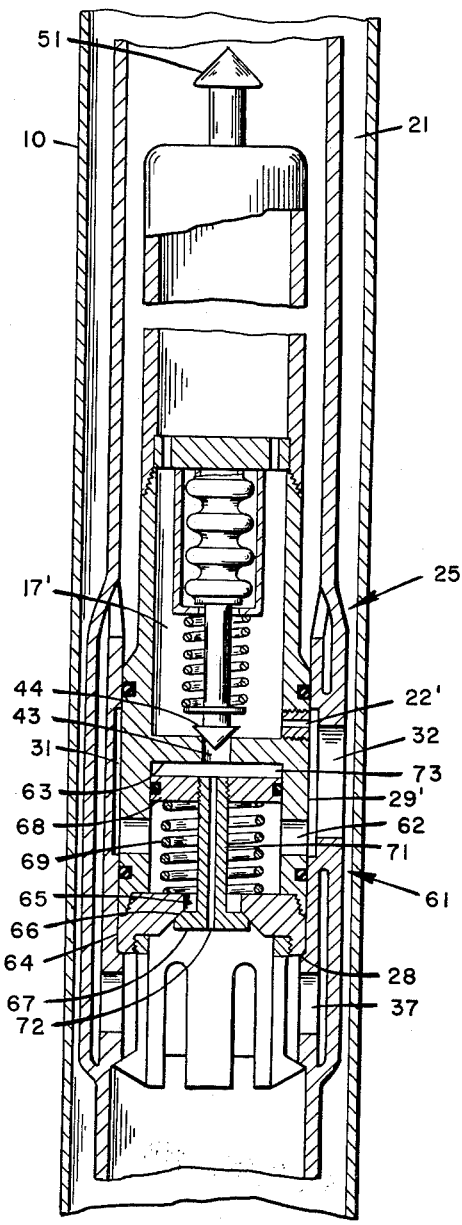
FIGURE 3 is a cross-sectional view of a preferred embodiment of a gas lift valve which will intermittently inject large quantities of gas into a well tubing at rapid rate and at any desired frequency.

This invention may be described in brief as a gas lift system of the continuously producing type wherein the liquid is lifted in short slugs by injecting gas into the liquid in the production conduit at high rate and in short bursts to produce a column having several alternate slugs of liquid and gas in the production conduit at one time. In its more particular aspects, this invention is directed to a gas lift valve which will intermittently inject gas into a production conduit at a frequency high enough to provide from about 2 to about 100 or more separate and distinct slugs of liquid in the production conduit at one time.

For more detailed description of this invention reference will now be made to the drawings. FIGURE 1 of the drawings shows schematically the elements of the invention and one embodiment of a suitable apparatus for continuously gas lifting liquid from a well. In this embodiment, the well is represented by a casing 10 which is equipped with a gas inlet 11 and a casing head 12 through which a production conduit or tubing 13 extends. The tubing has a fluid outlet 14 at the surface above the casing head and extends down into the casing 10 to an elevation which is desirably substantially below the working level of the liquid in the well. A standing valve 15 is typically provided in the lower end of the tubing below the working liquid level of the well to prevent backflow of the well fluids from the tubing into the well when a high pressure is imposed on the tubing during a gas injection cycle. A lower casing packer 16 in the annulus between the tubing and casing closes or seals this annular space and prevents well fluids from entering the gas chamber 17 between the lower packer 16 and the upper casing packer 18. This upper casing packer has an offset opening 19 connecting the gas chamber 17 with the gas conduit 21 which is typically the annular space between the tubing and casing above the upper casing packer 18. A removable orifice 22 in this offset opening permits gas to be metered into the gas chamber from the gas conduit at any desired rate. The volume of the gas conduit is many times greater, typically 100–1000 or more greater, than the volume of the gas chamber. That is, the space and volume between casing packers 16 and 18 are relatively small in comparison to the space and volume between the upper casing packer and the well head 12. One or more gas lift valves commonly referred to as "kick-off" valves 23 are connected to the vertical production conduit or tubing 13 at spaced points for the purpose of removing excess liquid in the well when gas lift operations are commenced. A high flow capacity, preferably snap-acting, gas lift valve 24 preferably near the standing valve controls the flow of gas from the gas chamber 17 into the lower end of the production conduit. This gas lift valve is operated, i.e., opened and closed, primarily by the pressure in the gas chamber. Gas lift valves of this type are available commercially from a number of sources. Typically, these so-called "working" gas lift valves are opened when the pressure of the lifting gas is high enough to inject gas into the production conduit, i.e., when the gas pressure is above a preset opening pressure. They are then closed when the pressure of the lifting gas is at some lower valve; namely, the preset closing pressure, thereby preventing the lifting gas from being wasted after sufficient gas has been injected into the production conduit to lift the slug of liquid which has accumulated since the previous lifting cycle.

The volume of the gas chamber 17, the flow capacity of the orifice 22, and the spread, i.e., opening and closing pressures, of the operating valves are selected so that the valve is open from about 1 to about 10 times or more per minute. The frequency of gas injection cycles and the length of each cycle can usually be determined best by trial-and-error, the best settings being those at which the lifting efficiency or the well productivity is highest. In every case the flow capacity of valve 24 when open is substantially greater, e.g., about two times greater, than the flow capacity of orifice 22 so that a high-pressure gas from gas conduit 21 flows into the gas chamber 17 substantially continuous and the gas lift valve 24 opens and closes as the pressure in the gas chamber rises and falls. The size of the orifice, other things being constant, is selected to control the ratio of gas-on/gas-off cycles, the larger the orifice the shorter the time the operating valve is closed and the higher the gas input and the injection frequency. The frequency can also be controlled by varying the volume of the gas chamber and by other means such as by varying the mean differential pressure across the orifice, i.e., by controlling the pressure in the gas conduit.

In operation, the bottom end of the production conduit is lowered to a substantial distance below the working or dynamic level of the liquid in the well so that the liquid will rise in the tubing to an elevation above the working or operating gas lift valve 24. After the packers are set gas is injected into the gas conduit through gas inlet 11. The kick-off valves 23 first admit gas to the tubing and allow liquid in the gas conduit to be displaced into the tubing. Eventually the working valve 24 takes over control of gas injection. Due to the differences in pressure across orifice 22 gas is metered at reasonably constant rate into gas chamber 17. When the pressure within that chamber is increased to the preset opening pressure of the operating valve 24, that valve snaps open and discharges fluid from the gas chamber into the lower end of the production conduit. When the operating valve opens, the pressure in the tubing rises rapidly. Desirably the fluid pressure in the tubing when the operating valve opens is greater than the pressure in the well at the standing valve 15 so it closes. This causes the slug of liquid in the tubing above the operating valve to be lifted by the gas. Since the flow of gas through the operating valve is substantially greater than the flow of gas through orifice 22, the pressure in the gas chamber 17 is immediately reduced to the preset closing pressure of the operating valve. When this closing pressure is reached and the valve closes, the gas continues to flow from the gas conduit through orifice 22 into the gas chamber and builds the gas chamber pressure back up to the preset opening pressure of working gas lift valve. During the time that this valve is closed the pressure within the production conduit is less than the well pressure and liquid flows into the lower end of the tubing through the standing valve. This liquid displaces the slug of gas and the slug of liquid above it higher into the production conduit. When the pressure in the gas chamber again reaches the preset opening pressure of the working gas lift valve, that valve again opens and injects another short slug of gas into the production conduit displacing the previous gas slugs and the alternate liquid slugs further toward the surface. This intermittent operation is continued at such a rapid rate that in effect the production is substantially continuous even at the bottom of the well. The optimum frequency of the injection cycles is the frequency at which the surface tubing pressure is low and is substantially uniform or steady. This condition is attained when the alternate slugs of liquid and gas arriving at the surface are so short that the stream issuing from the fluid outlet 14 is substantially homogeneous. Under this condition there is no excess gas and, therefore, the well is operating at maximum efficiency. Since a frequency lower than the optimum will not lift liquid from the well or will lift liquid by heading, it is generally desirable in determining the optimum frequency to first try a high frequency and then to decrease the frequency of gas injection until the well is just on the threshold of heading. The frequency of gas injection can thus best be determined by trial-and-error.

The working gas lift valve 24 may be fixed to the tubing and located in the annulus between the tubing and casing as shown in FIGURE 1. Alternatively, this valve may be of the insert or retrievable type as is well known in this art so that the valve can be removed as desired without pulling the production conduit. An apparatus of this type is shown in FIGURE 2. In this embodiment the gas chamber 17' is also retrievable so that either the volume of gas chamber or the flow capacity of the orifice 22' can be changed or the valve can otherwise be repaired without pulling the tubing 13. A cross-over fitting 25 is placed in the production conduit at the elevation where the retrievable working gas lift valve 24' is to be seated. This cross-over fitting comprises in part an outer shell 26 and a valve seating or inner sleeve 27. The inside diameter of sleeve 27 is smaller than the inside diameter of tubing 13 so that retrievable valves can be easily lowered through the tubing and will seat in the sleeve. The sleeve has means to anchor a retrievable valve in operating position. This may comprise an upper shoulder 28 smaller in diameter than the body 29 of the retrievable operating valve 24'. The shoulder stops the retrievable operating valve in operating position with the orifice 22' at the elevation of an annular recess 31 in the cross-over fitting. This annular recess is in fluid communication with the gas conduit 21 through radial openings 32 in the outer shell 26. Gas can thus flow from the gas conduit in the annular space between the casing 10 and the tubing 13 via the openings 32 and the orifice 22' into the gas chamber 17'. In some cases it is desirable to lock the retrievable working valve in this operating position. In one embodiment of such a lock a spring latch 33 is connected to the lower end of the valve body 29. Tapered catches 34 on the lower end of the cantilever springs 35 cooperate with a lower shoulder 36 in sleeve 27 to hold the retrievable operating valve down in this operating position against the force of well fluids rising in the tubing. However, due to the taper either on the catches as shown or on the lower shoulder, the retrievable valve can be unseated and removed from the tubing by use of a fishing tool which exerts a force greater than the force of the well fluids. Since the retrievable operating valve fills the sleeve 27, a fluid bypass through bottom port 37, annular passage 38, and upper port 39 is provided in the cross-over fitting 25. This bypass does not communicate with the annular recess 31 or the radial openings 32. An upper fluid seal 41 and a lower fluid seal 42 on the body 29 are spaced above and below the annular recess 31, respectively, when the valve is in operating position with the orifice 22' opposite the gas inlet opening 32 to thereby seal the space between the valve body and the inner sleeve of cross-over fitting 25 and cause the well fluids, as well as the gas discharging through the operating valve, to pass upwardly through the annular passage 38 around the valve. Flow of gas from the gas chamber outlet 43 into the production conduit is controlled by a valve member 44. Normally, this gas outlet and, therefore, the gas lift valve 24', is closed by the valve member due to the action of compression spring 45 which, acting against the bottom of the bellows housing 46, urges the valve member down. The valve member is connected at the upper end to a pressure-sensitive valve actuator or motor which includes, for example, the lower movable piston or head 47 of a variable volume chamber such as a bellows 48. This bellows is attached at the upper end to the upper gas chamber head 49. The bellows is filled with a compressible fluid such as Freon. The force of this compressible fluid is combined with the force of compression spring 45 to hold the valve member 44 down, counteract the upward force on the lower end piston due to the pressure in the gas chamber, and close the gas outlet 43. In some cases the upper head 49 is provided with a number of perforations 50 and a supplemental gas chamber 17'' is attached to the upper end of the body 29. The volume of the gas chamber 17' may thus be enlarged as a means of varying the operating frequency of the valve. A knob 51 at the upper end of the retrievable valve is provided for the purpose of inserting and removing the valve with an attachable overshot fishing device.

In operation the cross-over fitting is lowered into the casing 10 on the production conduit to the elevation at which it is desired to inject gas into the production conduit and the casing head 12 is attached. Obviously, two or more of these or similar cross-over fittings may be installed at spaced points along the production conduit so that, if desired, retrievable kick-off valves can be installed at preselected elevations. The size of orifice 22' is then selected hand a removable nipple 52 containing the orifice is threaded into the wall of the valve body 29. The removable valve 24' is then either dropped or lowered by a wire line tool into position in the cross-over fitting as shown. Gas is then injected into the gas conduit 21. After excess liquid is displaced out of the tubing and the gas conduit, gas passes through the opening 32, the orifice 22', and thence into the gas chamber 17'. Gas flows from the high-pressure gas conduit into the gas chamber until the pressure in the gas chamber is as great as the preset opening pressure of the valve. When this opening pressure is reached the downward force on the valve member due to the compression spring and the compressible fluid in the bellows 48 is overcome by the pressure of the gas acting on the lower bellows head 47 plus the pressure of the well fluids acting on the lower end of the valve member 44 via gas outlet 43 and the valve member is thus raised, opening the outlet. The pressure in the gas chamber when the valve opens is greater than the pressure in the tubing so that as the valve member rises it is exposed on the end to increasing pressure causing the valve to snap open. The gas in the gas chamber being at a higher pressure than the tubing and the bottomhole pressures is then discharged through gas outlet 43 into the production conduit below the operating valve raising the tubing pressure to a point at which flow of well fluids into the tubing is temporarily stopped. The liquid level of the well fluids is thus held at the crossover fitting bottom port 37 and gas passing through this port raises the well fluids and displaces them as a slug up through the annular fluid passage 38, out through the upper port 39 and the annular space 54 into the production conduit.

Gas outlet 43 is substantially larger, typically 2–5 times larger in cross-sectional area than orifice 22'. The gas within the gas chamber thus escapes much more rapidly than gas enters the chamber through the orifice. This rapidly reduces the pressure within the gas chamber. When the pressure is reduced to the preset closing pressure of the working valve, the force of compression spring 45 and of the expansible fluid therein on the lower bellows head 47 is great enough to overcome the upward force on the movable lower wall of the bellows due to the gas pressure in the gas chamber and, therefore, the valve closes. The valve member also snaps shut due to greater differential forces on the end of the valve member as it approaches the gas outlet 43. When the valve closes, the gas continues to be metered into the gas chamber through the orifice, building up the pressure in the gas chamber until the opening pressure of the valve is again reached. During this time when the valve is closed, well fluids are entering the lower end of the production conduit and flowing upwardly through the bottom port 37, the bypass fitting, etc., displacing the previous slug of liquid and the intermediate gas slug upwardly in the production conduit toward the surface. The valve continues to operate, i.e., open and close, as the pressure oscillates in the gas chamber thereby intermittently injecting into the tubing at high frequency slugs of gas and slugs of liquid. Since the volume of the gas conduit is many times greater than the volume of the gas chamber, the pressure in the gas conduit remains substantially constant. It can thus be seen that the working valve, which is in fluid communication with the gas chamber and is primarily sensitive only to the pressure therein, can be made to open and close at high frequency even though the pressure in the relatively high volume gas conduit remains substantially constant.

Due to the importance of injecting gas into the production conduit at a rapid rate, it is sometimes desirable to increase the capacity or rate of gas injection of an apparatus of the type described above. A preferred type of gas lift valve for injecting gas into the tubing in high-frequency, high-volume slugs is shown in FIGURE 3. In this preferred embodiment, an auxiliary gas valve 61, actuated by a pressure-sensitive pilot valve operating like the above-described retrievable gas lift valve 24', is attached to the lower end of modified valve body 29'. There are a number of inlet gas ports 62 in the wall of the valve body below the lower gas chamber head 63. When the retrievable valve is in operating position in the bypass fitting 25 with its lower end resting on the upper shoulder 28, these gas inlet ports are aligned and in fluid communication with the opening 32 in the bypass fitting. The orifice 22' is also in fluid communication with this opening so that gas from the gas conduit 21 enters both the gas chamber 17' and the auxiliary gas valve 61 through the same opening. A lower head 64 in the auxiliary valve has an axial outlet port 65 with a valve seat 66. The auxiliary valve member 67 is connected to an auxiliary valve fluid motor including a piston 68 and both are held in an upward position with the auxiliary valve closed by compression spring 69 which rests at the lower end on the lower auxiliary valve head 64. The area of piston 68 is desirably about equal to the area of valve member 67 so that the auxiliary gas valve is insensitive to upstream pressure. The valve stem 71 of the auxiliary valve member and the valve member itself have an axial exhaust opening 72 through which gas from the gas chamber 17' and the auxiliary valve gas chamber 73 passes down into the production conduit. The cross-sectional area of this exhaust opening is less than the cross-sectional area of gas chamber outlet 43 and is larger than the cross-sectional area of orifice 22'.

This retrievable valve which includes the auxiliary valve 61 is lowered into and seated in position in the by-pass fitting 25 in the same manner as the retrievable gas lift valve shown in FIGURE 2. When the valve is in operating position, gas injected into the well through gas conduit 21 passes through the opening 32 and thence through orifice 22' into the pilot gas chamber 17'. As the pressure in the pilot gas chamber increases and reaches the preset opening pressure of the pilot valve, valve member 44 is raised as above described. Gas in the gas chamber then flows through the gas chamber outlet 43 into the auxiliary valve gas chamber and thence through the exhaust opening 72 into the production conduit. However, since the cross-sectional area and thus the flow capacity of the opening 72 is less than the cross-sectional area and the flow capacity of gas outlet 43, the pressure in the auxiliary valve gas chamber 73 is substantially equalized with the gas pressure in the gas chamber 17'. This pressure, acting against the piston 68, is sufficient to overcome the force of compression spring 69 and the auxiliary valve member 67 is moved downwardly opening the auxiliary gas valve 61. With this auxiliary valve open the gas in the gas chamber 17' flowing into the production conduit is supplemented by gas flowing directly into the same conduit from the gas conduit 21 via gas inlet ports 62 and the outlet port 65. It can be seen that by thus employing an auxiliary gas valve actuated by a rapid acting pressure-sensitive pilot valve, the rate of gas injection and the quantity of gas injected into the production conduit during a short gas injection cycle can be substantially increased in comparison to the rate and quantity of gas injected through the pilot gas lift valve alone. This facilitates the separation of the gas and liquid into discrete slugs.

From the foregoing it can be seen that various modifications can be made in the gas lift system disclosed.

For example, while the gas chamber and the operating or working valve may both be placed in the annular space between the casing and the tubing or they may both be placed within the tubing as retrievable equipment, in some cases it will be desirable to employ the external type gas chamber and the retrievable valve, or vice versa. This invention being thus susceptible to wide variation of embodiments should not be construed to be limited to the embodiments specifically described above. It should instead be construed to be limited only by the scope of the appended claims.

I claim:

1. An apparatus for gas lifting liquid comprising a vertical liquid conduit, a gas conduit, a gas chamber between said liquid conduit and said gas conduit, the volume of said gas chamber being substantially less than the volume of said gas conduit, an orifice between said gas conduit and said gas chamber to meter gas from said gas conduit into said gas chamber, a gas outlet from said gas chamber leading into said vertical liquid conduit, the flow capacity of said outlet being substantially greater than the flow capacity of said orifice, and valve means to close said outlet when the pressure in said gas chamber is below a predetermined pressure and to open said outlet when the pressure in said gas chamber is above said predetermined pressure.

2. An apparatus for gas lifting liquid comprising a vertical liquid conduit, a gas conduit, a gas chamber between said liquid conduit and said gas conduit, the volume of said gas chamber being substantially less than the volume of said gas conduit, an orifice between said gas conduit and said gas chamber to meter gas from said gas conduit into said gas chamber, a gas outlet from said gas chamber leading into said vertical liquid conduit, the flow capacity of said gas outlet being substantially greater than the flow capacity of said orifice, a valve member adapted to close said gas outlet, and a pressure-sensitive valve actuator in fluid communication with said gas chamber to operate said valve member, said valve actuator being adapted to open said gas outlet when the pressure in said gas chamber is above a preset opening pressure and to close said gas outlet when the pressure in said gas chamber is below a preset closing pressure.

3. An apparatus for gas lifting liquid from a well comprising a casing in said well, a production conduit in said casing, the annular space between said casing and said production conduit forming a gas conduit, an upper packer in the said annular space at the lower end of said gas conduit and near the lower end of said production conduit, a lower packer in said annular space below said upper packer, said lower packer and said upper packer forming with said annular space a gas chamber, an orifice in said upper packer to meter fluid from said gas conduit into said gas chamber, a gas outlet from said gas chamber into said production conduit, the flow capacity of said gas outlet being substantially greater than the flow capacity of said orifice, and a pressure-sensitive valve means to open and close said outlet, said valve means being actuated to close said gas outlet when the pressure in said gas chamber is below a preset closing pressure and to open said gas outlet when the pressure in said gas chamber is above a preset opening pressure, said preset opening pressure being higher than said preset closing pressure.

4. An apparatus for gas lifting liquid from a well comprising a tubing, a cross-over fitting near the lower end of said tubing, a gas conduit extending down into said well to said cross-over fitting, a fluid bypass longitudinally through said cross-over fitting, a radial opening in said cross-over fitting to admit gas from said gas conduit into said tubing, a gas lift valve in said cross-over fitting, a gas chamber in said gas lift valve, an orifice in said gas chamber in communication with said radial opening to meter gas into said gas chamber, an outlet from said gas chamber to said tubing, the flow capacity of said outlet being substantially greater than the flow capacity of said orifice, a valve member to close said outlet, and pressure-sensitive motor means for actuating said valve member, said motor means being in communication with said gas chamber and adapted to close said outlet when the pressure in said gas chamber is below a preset closing pressure and to open said outlet when the pressure in said gas chamber is above a preset opening pressure.

5. A gas lift valve assembly comprising a pressure actuated valve means, a gas chamber enclosing said valve means, an orifice to meter gas into said chamber, an outlet from said gas chamber, the flow capacity of said outlet being substantially greater than the flow capacity of said orifice, said valve means being adapted to close said outlet, a fluid motor connected to said valve means, said fluid motor being actuated to move said valve means in one direction and close said outlet when the pressure in said gas chamber is below a preset closing pressure and being actuated to move said valve means in another direction and open said outlet when the pressure in said gas chamber is above a preset opening pressure.

6. A gas lift valve according to claim 5 wherein said preset opening pressure is greater than said preset closing pressure.

7. A gas lift valve according to claim 5 wherein said fluid motor comprises an enclosed variable volume chamber having one movable head, said movable head being in fluid communication with said gas chamber and being connected to said valve means, and an expansible fluid in said variable volume chamber whereby the volume of said variable volume chamber and the position of said valve member is controlled by the pressure in said gas chamber.

8. A retrievable gas lift valve for injecting slugs of gas into a production conduit within a well at high frequency, said well having a casing and a production conduit therein, a cross-over fitting at the lower end of said production conduit, the annular space between said production conduit and said casing forming a gas conduit in said well down to said cross-over fitting, a radial opening in said cross-over fitting to admit gas from said gas conduit into said production conduit, a packer in said annular space between said casing and said production conduit below said radial opening, a fluid bypass longitudinally through said cross-over fitting providing separate fluid communication along said production conduit, said fluid bypass including an inlet port below said radial opening, an outlet port above said radial opening, means to separate fluid in said fluid bypass from the gas in said radial opening, and shoulder means on the inside of said cross-over fitting, said retrievable gas lift valve comprising an elongated cylindrical body, means including said body forming a gas chamber in said valve, an orifice in said chamber providing fluid communication between said gas conduit and said gas chamber when said gas lift valve is anchored in operating position in said cross-over fitting, a gas outlet in said chamber, the flow capacity of said gas outlet being substantially greater than the flow capacity of said orifice so that the pressure variation within said gas chamber is substantially greater than the pressure variation in said gas conduit, valve means to close said gas outlet, motor means in fluid communication with said gas chamber connected to said valve means to move said valve means and open and close said gas outlet, said valve means being raised by said motor means to open said gas outlet when the pressure in said gas chamber is above a preset opening pressure and being lowered to close said gas outlet when said pressure in said gas chamber is below a preset closing pressure, packing means on said body above and below said orifice adapted to form a fluid seal with said cross-over fitting above and below said radial opening, and resilient latch means on said body adapted to cooperate with said shoulder means and anchor said retrievable gas lift valve in said operating position in said cross-over fitting.

9. An apparatus for gas lifting liquid from a well comprising a production conduit, a cross-over fitting at the lower end of said production conduit, a radial opening through the wall of said cross-over fitting, a gas conduit extending from the surface down through said well to said radial opening, a well fluid inlet to said production conduit, a standing valve in said well fluid inlet, a fluid passage from said radial opening into said production conduit, an auxiliary valve in said fluid passage, an auxiliary valve fluid motor to open and close said auxiliary valve, and a pilot gas lift valve for controlling said fluid motor to open and close said fluid passage, said pilot gas lift valve including a gas chamber, an orifice connecting said gas chamber with said gas conduit to meter gas from said gas conduit into said gas chamber, an outlet from said gas chamber to said fluid motor, an exhaust opening from said fluid motor to said production conduit, the flow capacity of said exhaust opening being greater than the flow capacity of said orifice but less than the flow capacity of said outlet, a valve member adapted to open and close said outlet, a sealed variable volume pressurized bellows having one end fixed to said gas chamber and a movable end connected to said valve member and in fluid communication with the gas in said gas chamber for opening said outlet when the pressure in said gas chamber is greater than a preset opening pressure and for closing said outlet when the pressure in said gas chamber is below a preset closing pressure.

10. A retrievable gas lift valve comprising an elongated cylindrical body, means including said body and a lower head forming a first gas chamber in said body, an orifice in the wall of said body to meter gas into said first gas chamber, an outlet in said lower head, the flow capacity of said outlet being substantially greater than the flow capacity of said orifice, a valve member normally closing said outlet, an expandable sealed bellows within said first gas chamber having one end fixed to said first gas chamber and a movable end connected to said valve member to raise said valve member and open said outlet when the pressure in said first gas chamber is above a preset opening pressure, an auxiliary valve gas chamber in said body below said lower head and including a piston in fluid communication with said outlet, an auxiliary fluid passage through said body below said piston, said auxiliary fluid passage including an inlet port in the wall of said body and an outlet port in the bottom of said body, an auxiliary valve member connected to said piston and adapted to seat on said outlet port and close said auxiliary fluid passage, resilient means normally urging said auxiliary valve member to close said outlet port, and an exhaust opening through said piston and auxiliary valve member, the flow capacity of said exhaust opening being greater than the flow capacity of said orifice but less than the flow capacity of said outlet whereby gas from a high-pressure source in fluid communication with said orifice metered into said first gas chamber will build up a pressure in said first gas chamber as great as said preset opening pressure to raise said valve member and open said outlet, and when said outlet is open the gas in said first gas chamber is discharged through said outlet into said auxiliary valve gas chamber to move said piston and said auxiliary valve member and open said auxiliary fluid passage.

11. An apparatus for gas lifting liquid from a well comprising a casing in said well, a tubing in said well, a cross-over fitting near the lower end of said tubing below the working liquid level in said well, a radial opening through said cross-over fitting, the annular space between said tubing and said casing forming a gas conduit in said well down to said radial opening, an outer shell on said cross-over fitting, an inner sleeve in said cross-over fitting, a longitudinal well fluid passage between said outer shell and said inner sleeve, a bottom port connecting the inside of said tubing to said well fluid passage below said radial opening, an upper port connecting said well fluid passage to the inside of said tubing above said radial opening, an upper and a lower shoulder on the inside of said inner sleeve, and a retrievable gas lift valve in said cross-over fitting, said gas lift valve having an elongated cylindrical body adapted to fit in said inner sleeve and rest on said upper shoulder, resilient latch means on said body adapted to cooperate with said lower shoulder to anchor said gas lift valve in said cross-over fitting, means including said body and a lower gas chamber head forming a first gas chamber in said gas lift valve, an orifice through the wall of said gas chamber in fluid communication when said body rests on said upper shoulder with said radial opening, a gas outlet in said lower gas chamber head, a valve member for opening and closing said outlet, an expandable sealed bellows within said first gas chamber having one end fixed to said first gas chamber and a movable end connected to said valve member for actuating said valve member to open and close said outlet, an auxiliary gas valve chamber in said body below said lower gas chamber head including a piston in one end of said auxiliary gas valve chamber, said auxiliary gas valve chamber being in fluid communication with said gas outlet, an auxiliary gas passage through said retrievable gas lift valve having an inlet port in fluid communication with said radial opening and an outlet port in fluid communication with the inside of said tubing, an auxiliary valve member connected to said piston and adapted to seat on and close said outlet port, resilient means urging said auxiliary valve member normally to close said outlet port, and an exhaust opening in said auxiliary valve member providing a fluid outlet from said auxiliary valve gas chamber into said tubing, said exhaust opening having a flow capacity greater than the flow capacity of said orifice but less than the flow capacity of said first gas chamber outlet whereby said auxiliary fluid passage is intermittently opened and closed by the intermittent buildup and release of pressure in said first gas chamber and slugs of gas can be injected at high frequency from said gas conduit into said tubing.

References Cited in the file of this patent

UNITED STATES PATENTS

| | | |
|---|---|---|
| 2,339,487 | King | Jan. 18, 1944 |
| 2,465,060 | Carlisle | Mar. 22, 1949 |
| 2,620,740 | Garrett et al. | Dec. 9, 1952 |
| 2,620,741 | Garrett | Dec. 9, 1952 |
| 2,642,889 | Cummings | June 23, 1953 |
| 2,672,827 | McGowen | Mar. 23, 1954 |
| 2,845,940 | Garrett et al. | Aug. 5, 1958 |